United States Patent
Liu et al.

(10) Patent No.: US 10,287,807 B2
(45) Date of Patent: May 14, 2019

(54) GLOVEBOX DOWNSTOP WITH BI-DIRECTIONAL INTERLOCKING FEATURE

(71) Applicant: Ford Global Technologies, LLC, Dearborn, MI (US)

(72) Inventors: Frank Qiukui Liu, Canton, MI (US); Francis Raymond Gillis, Farmington Hills, MI (US); Thomas Junior Luckett, Saline, MI (US); Vijaykumar Hegde, Canton, MI (US); Matthew Jameson Hickey, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 15/471,568

(22) Filed: Mar. 28, 2017

(65) Prior Publication Data
US 2018/0283064 A1    Oct. 4, 2018

(51) Int. Cl.
| E05B 83/30 | (2014.01) |
| B60R 7/06 | (2006.01) |
| E05C 17/52 | (2006.01) |
| E05F 5/00 | (2017.01) |

(52) U.S. Cl.
CPC .............. *E05B 83/30* (2013.01); *B60R 7/06* (2013.01); *E05C 17/52* (2013.01); *E05F 5/00* (2013.01)

(58) Field of Classification Search
CPC ... B60R 7/04; B60R 7/06; E05B 83/30; E05C 17/025; E05C 17/52
USPC .............................................. 296/37.8, 37.12
See application file for complete search history.

(56) References Cited

U.S. PATENT DOCUMENTS

| 5,385,378 | A | 1/1995 | Hakamada et al. |
| 5,845,954 | A | 12/1998 | DePue |
| 5,951,083 | A * | 9/1999 | Bittinger .................. B60N 3/12 16/339 |
| 6,076,878 | A | 6/2000 | Isano |
| 6,899,364 | B2 | 5/2005 | Park et al. |
| 6,945,579 | B2 | 9/2005 | Peck, Jr. et al. |
| 8,403,392 | B2 | 3/2013 | Okimoto |
| 2004/0066053 | A1* | 4/2004 | Fero .......................... B60R 7/06 296/37.8 |
| 2007/0205624 | A1* | 9/2007 | Zellner, Jr. ................ B60R 7/06 296/37.12 |

\* cited by examiner

*Primary Examiner* — Jason S Daniels
(74) *Attorney, Agent, or Firm* — Vichit Chea; Price Heneveld LLP

(57) ABSTRACT

A vehicle glovebox includes a frame rotationally operable within a housing. A downstop is defined within the frame, wherein the downstop in a blocking position engages the housing to define a fully-open position of the frame. The downstop is operable to a release position that defines rotation of the frame beyond the fully-open position.

18 Claims, 8 Drawing Sheets

GLOVEBOX DOWNSTOP WITH BI-DIRECTIONAL INTERLOCKING FEATURE

FIELD OF THE INVENTION

The present invention generally relates to storage containers disposed within the passenger cabin of a vehicle and more specifically, a glovebox having an integral downstop that operates bi-directionally for performing rotation limiting and release functions.

BACKGROUND OF THE INVENTION

Automobiles typically include interior storage compartments, such as a glovebox mounted within a dashboard of a vehicle. These compartments are typically rotationally operable from within the dashboard, so that the user can access and close the compartment as needed.

SUMMARY OF THE INVENTION

According to one aspect of the present invention, a vehicle glovebox includes a frame rotationally operable within a housing. A downstop is defined within the frame, wherein the downstop in a blocking position engages the housing to define a fully-open position of the frame. The downstop is operable to a release position that defines rotation of the frame beyond the fully-open position.

Embodiments of this aspect of the invention can include any one or combination of the following features:
- the downstop is connected to the frame at a deflecting flange
- the deflecting flange is integrally formed with each of the frame and the downstop
- a reinforced position of the downstop is defined by an outward deflection of the downstop of a first distance from the blocking position
- wherein the release position of the downstop is defined by an inward deflection of the downstop of a second distance from the blocking position
- the second distance from the blocking position is greater than the first distance from the blocking position
- the frame includes a reinforcing interlock that extends around the downstop, wherein the reinforcing interlock receives the downstop in the reinforced position and limits the outward deflection of the downstop to the first distance
- the reinforced position of the frame is defined by a downward force applied to the frame when the frame is in the fully-open position
- the downstop includes an interlock flange that engages the housing in the blocking position when the frame is in the fully-open position, and wherein the interlock flange engages both of the housing and the reinforcing interlock when the frame is in the reinforcing position
- the housing selectively engages a front surface of the interlock flange in the fully-open position and the reinforcing position, and wherein the reinforcing interlock engages a rear surface of the interlock flange when the frame is in the reinforcing position
- the downstop is moved to the reinforcing position upon application of a first force upon the downstop and in a direction substantially normal to and toward a receiving surface of the reinforcing interlock, the first force having a first magnitude, and wherein the downstop is moved to the release position upon application of a second force upon the downstop and in a direction generally perpendicular to the first force and toward an interior of the frame, wherein the second force has a second magnitude, wherein the first magnitude is greater than the second magnitude
- the deflecting flange is a substantially rigid member that rotates about a living hinge
- the living hinge is disposed proximate a rear wall of the frame.
- when the downstop is in the release position, the interlock flange is at least partially disposed within the interior of the frame and is adapted to bypass the housing to define a removal position of the frame, wherein the frame is removable from the housing in the removal position
- the release position of the interlock flange places the interlock flange within a boundary defined between an outer surface of the reinforcing interlock and an exterior surface of a sidewall of the frame
- the release position of the interlock flange places the interlock flange within a boundary defined between a portion of the housing proximate an outer surface of the reinforcing interlock and an exterior surface of a sidewall of the frame According to another aspect of the present invention, a vehicle includes a housing disposed within a dashboard. A frame is rotationally operable within the housing. An interlock flange is operable within the frame between a blocking position that engages the housing in a fully-open position, a release position wherein the frame is selectively removable from the housing, and a reinforced position wherein the interlock flange is contained between the frame and a reinforcing interlock for limiting over rotation of the frame.

Embodiments of this aspect of the invention can include any one or combination of the following features:
- the reinforced position of the interlock flange is defined by an outward deflection of the interlock flange of a first distance from the blocking position
- wherein the release position of the interlock flange is defined by an inward deflection of the interlock flange of a second distance from the blocking position, and wherein the second distance from the blocking position is greater than the first distance from the blocking position According to another aspect of the present invention, a glovebox includes a container having an interior. A reinforcing interlock extends outward from a sidewall of the container. An interlock flange is generally perpendicular to the sidewall in a blocking position. The interlock flange is selectively operable between an inward release position wherein the interlock flange is at least partially within the interior, and an outward reinforcing position wherein the interlock flange engages the reinforcing interlock.

Embodiments of this aspect of the invention can include any one or combination of the following features:
- the container, the reinforcing interlock and the interlock flange are integrally formed as a single piece
- the interlock flange is rotationally operable relative to the container about a living hinge defined within a rear wall of the container
- the release position of the interlock flange places the interlock flange within a clearance space defined between an outer surface of the reinforcing interlock and an exterior surface of the sidewall These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
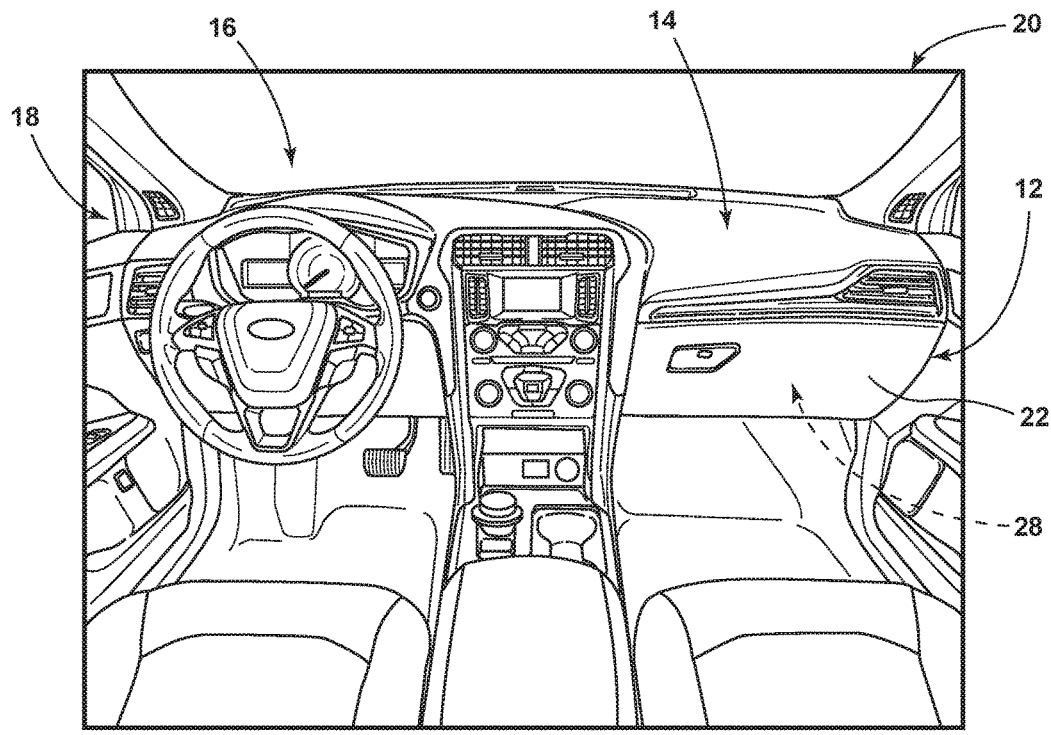
FIG. 1 is a perspective view of a dashboard disposed within a passenger compartment of a vehicle and showing the glovebox in a closed position.
Figure 2:
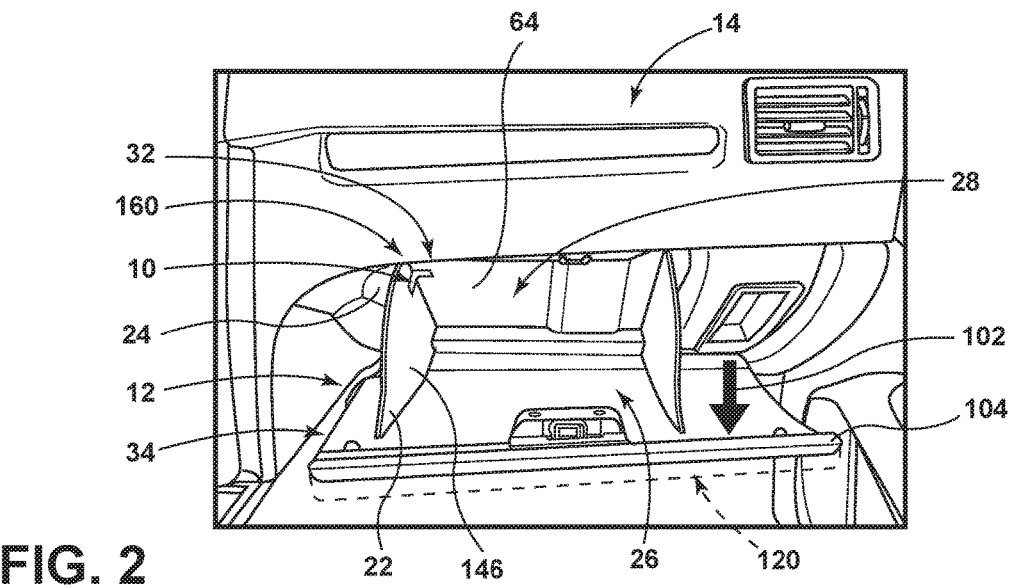
FIG. 2 is an enlarged perspective view of a glovebox shown in a fully-open position.
Figure 3:
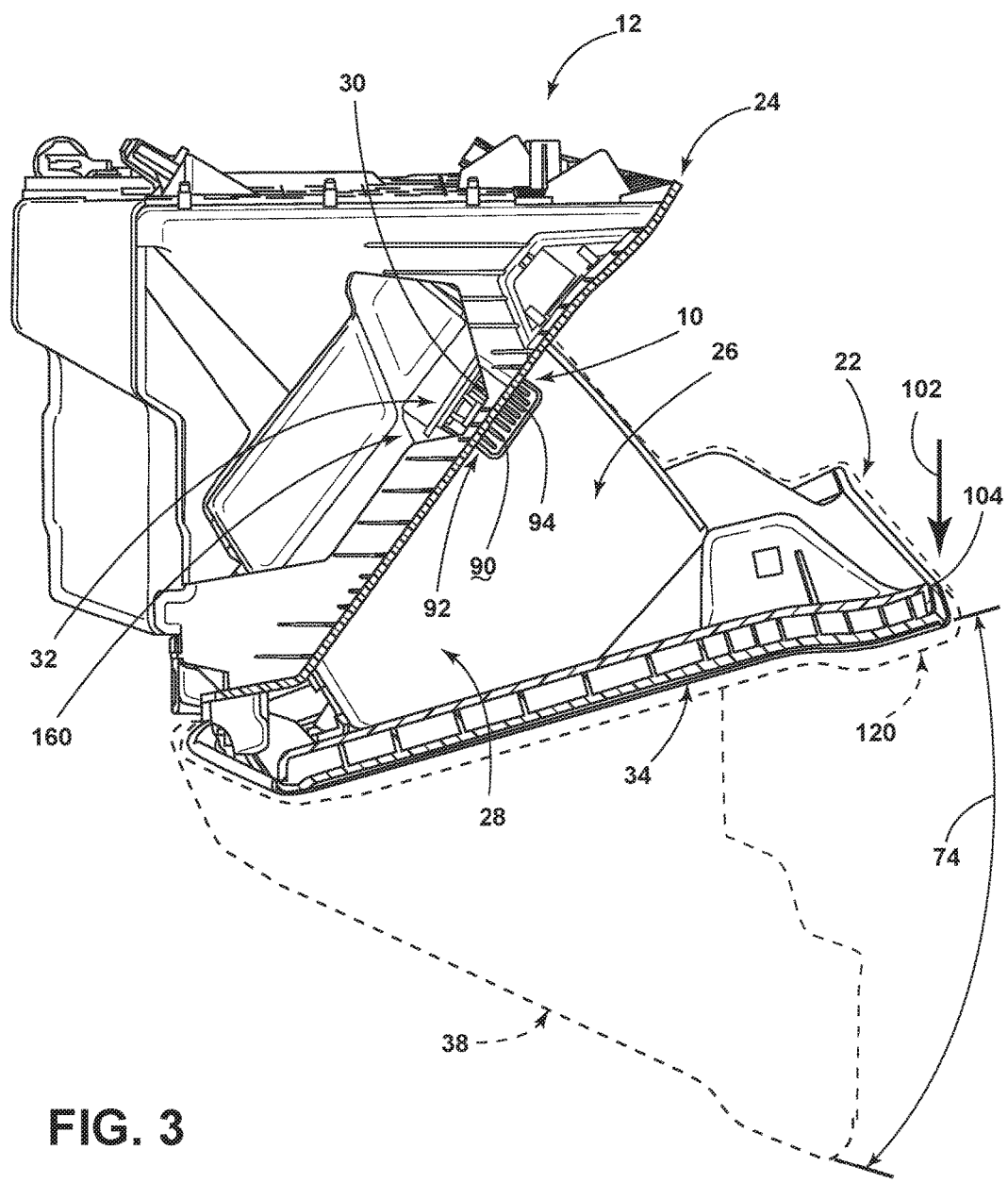
FIG. 3 is a cross-sectional view of a glovebox assembly for a vehicle showing the glovebox in the fully-open position.
Figure 4:
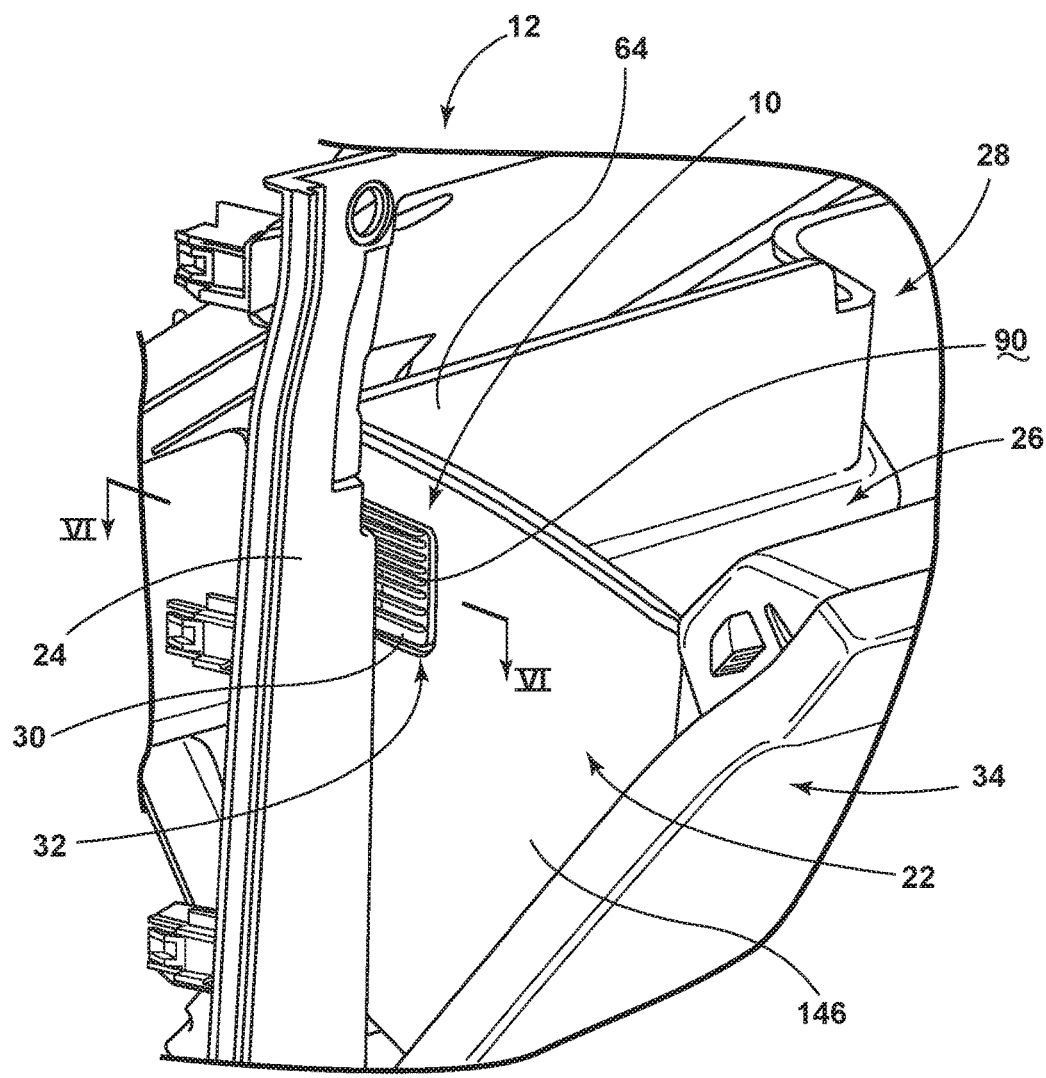
FIG. 4 is an enlarged perspective view of the glovebox assembly of FIG. 3 showing the glovebox in the fully-open position.
Figure 5:
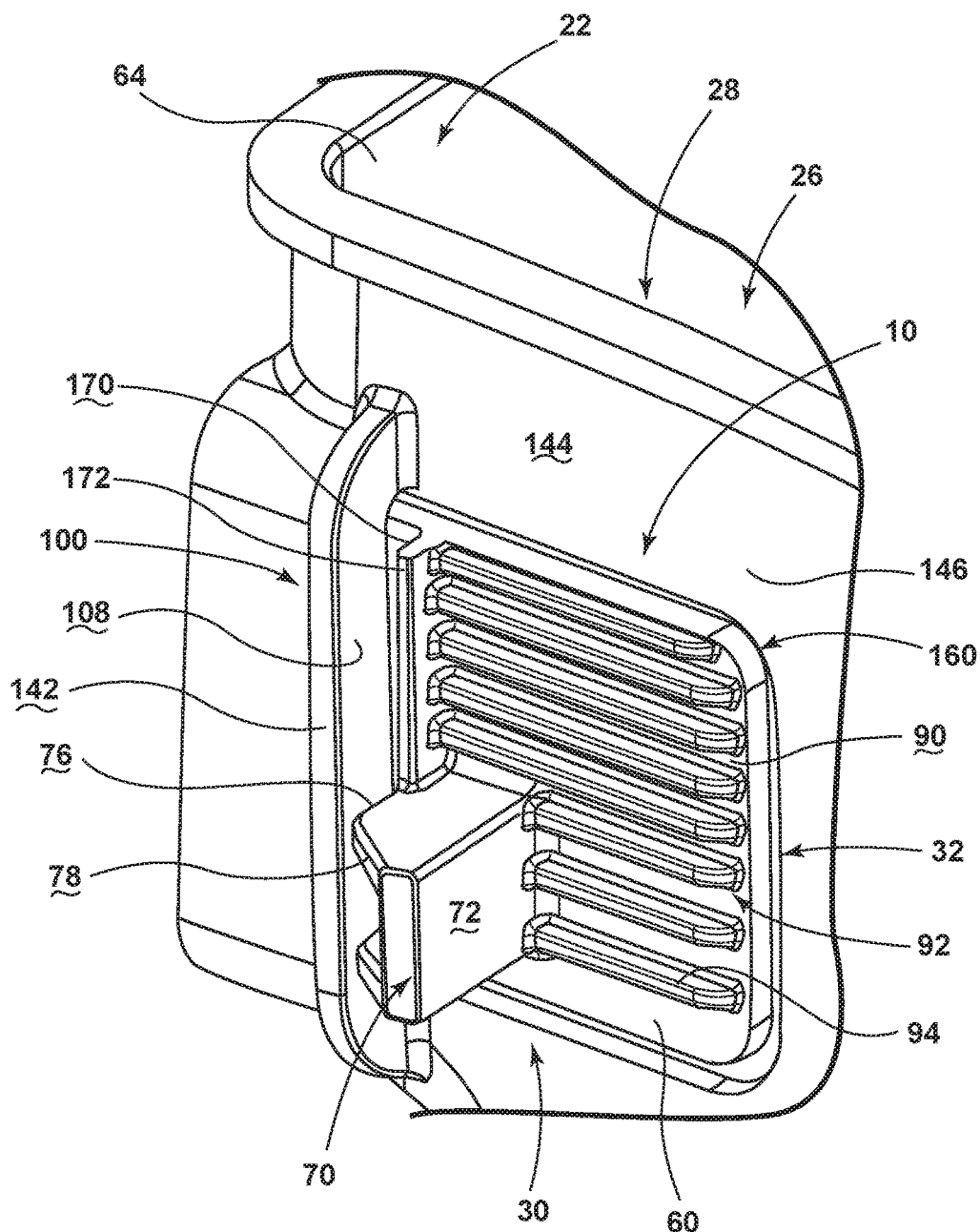
FIG. 5 is a side perspective view of an aspect of the reinforcing interlock for a glovebox assembly.
Figure 6:
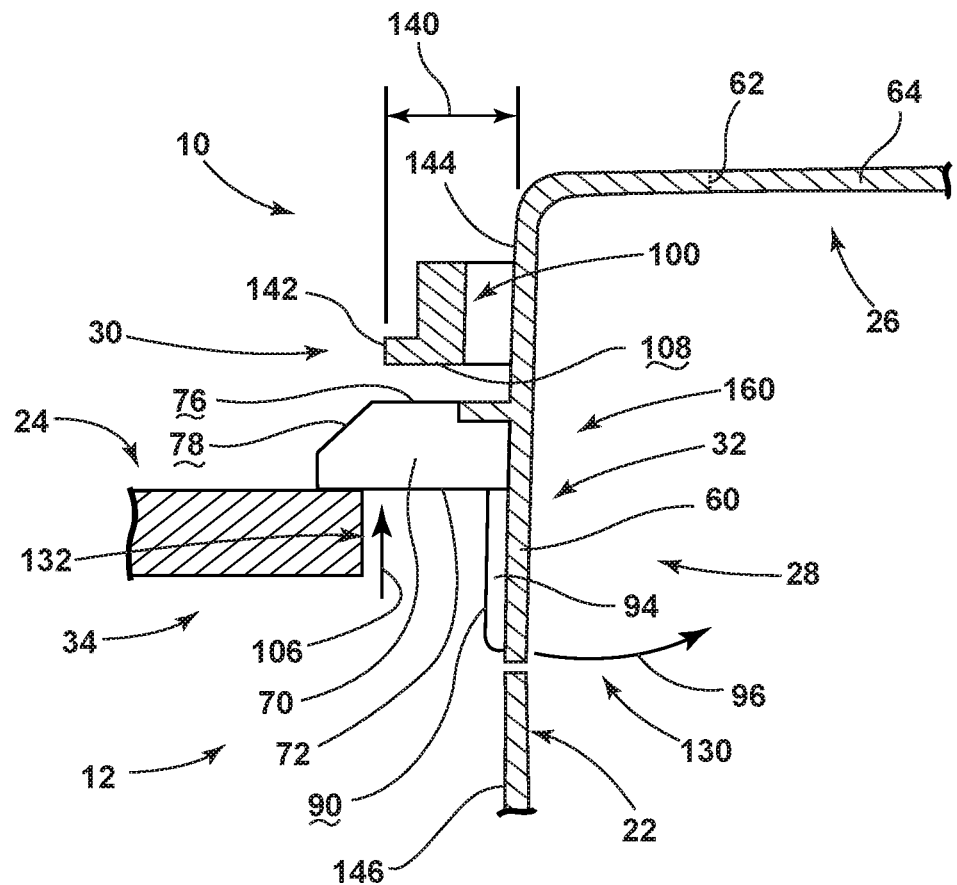
FIG. 6 is a cross-sectional view of the glovebox assembly of FIG. 4, taken along line VI-VI.
Figure 7:
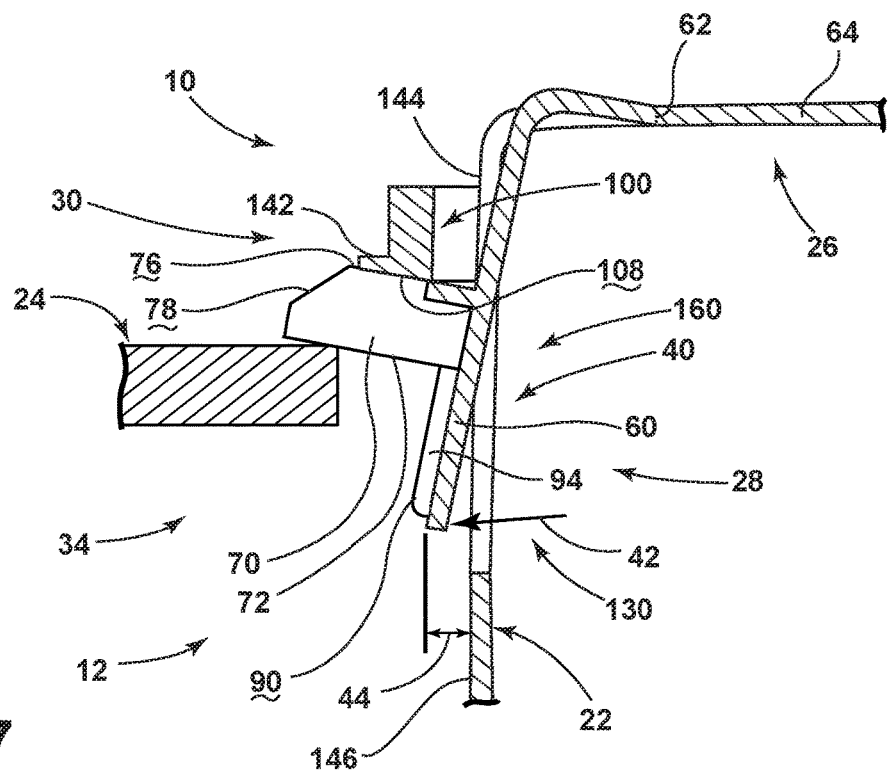
FIG. 7 is a cross-sectional view of the glovebox assembly of FIG. 6 showing the downstop in the reinforced position.
Figure 8:
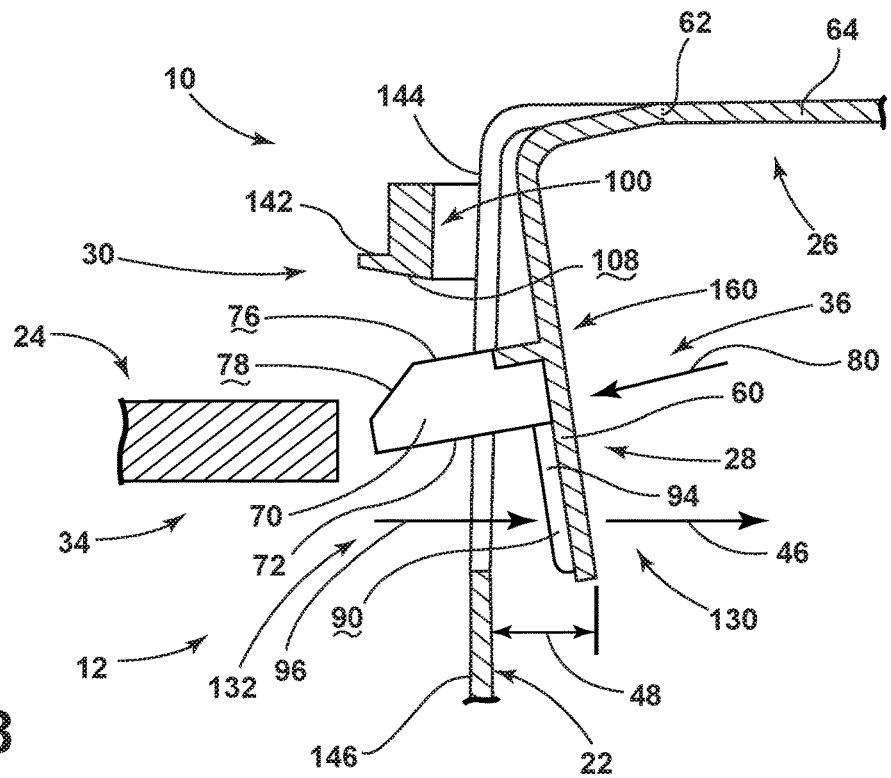
FIG. 8 is a cross-sectional view of the glovebox assembly of FIG. 6 showing the downstop in a release position.
Figure 9:
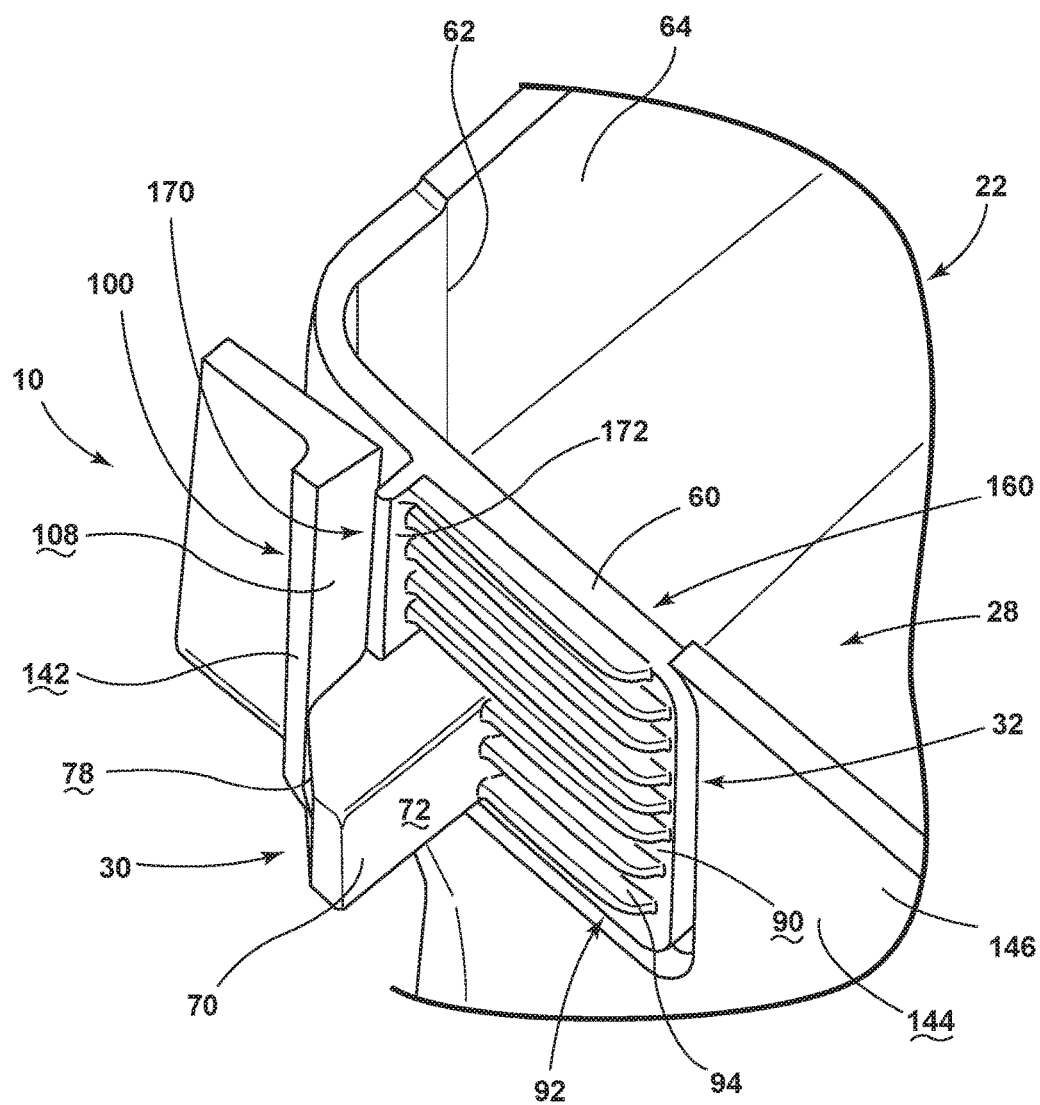
FIG. 9 is a top perspective view of an aspect of the interlock system for a glovebox assembly.
Figure 10:
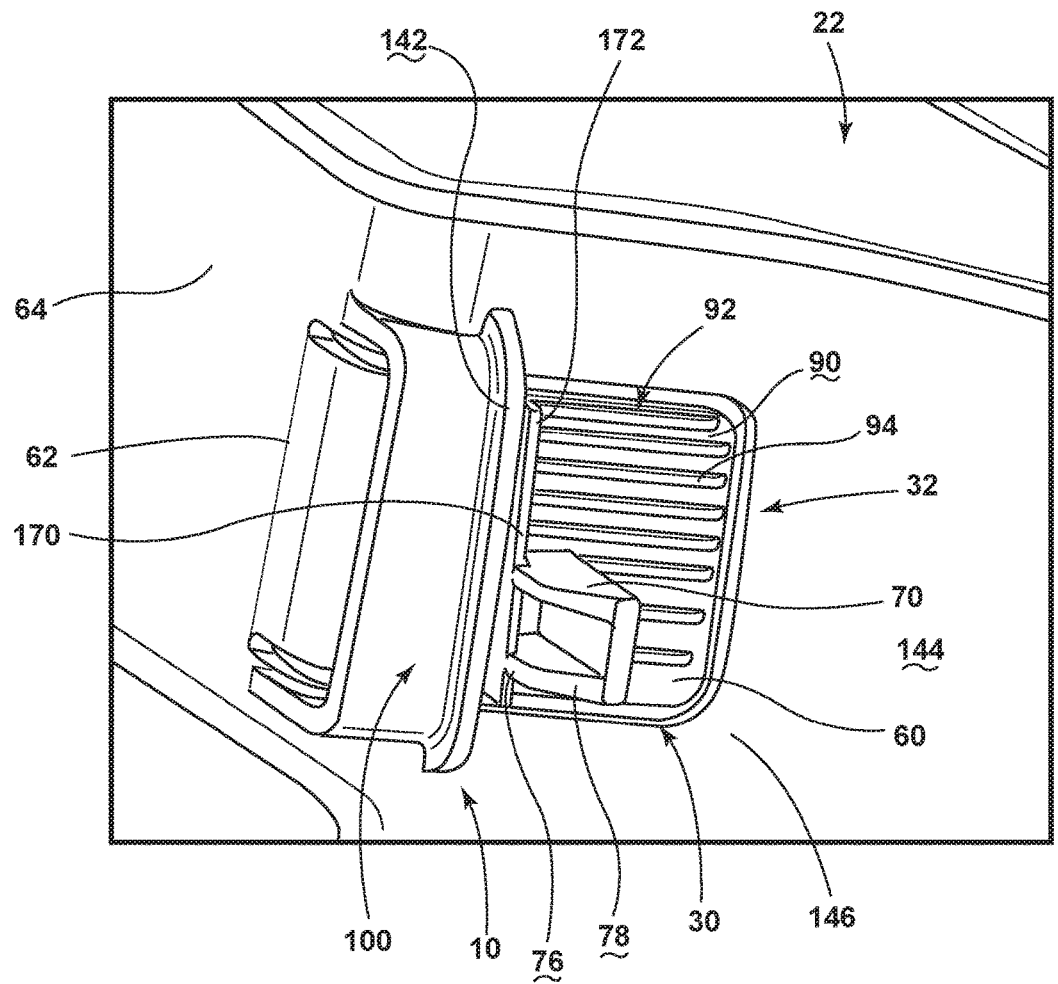
FIG. 10 is a side perspective view of an aspect of the interlock system for a glovebox assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-8, reference numeral 10 generally refers to an interlock system disposed within a glovebox assembly 12 where the interlock system 10 supports the operability of the glovebox assembly 12. The glovebox assembly 12 is typically disposed within a dashboard 14 set within a front portion 16 of the passenger compartment 18 of the vehicle 20. According to the various embodiments, the glovebox assembly 12 for the vehicle 20 can include a frame 22 that is rotationally operable within a housing 24. The frame 22 can correspond to a container 26 having an interior 28 that can be used for storing various items within the dashboard 14 of the vehicle 20. A downstop 30 can be defined within the frame 22. In such an embodiment, the downstop 30, when in a blocking position 32, selectively engages the housing 24 to define a fully-open position 34 of the frame 22 with respect to the housing 24. The downstop 30 is operable to a release position 36 that serves to define a rotation of the frame 22 beyond the fully-open position 34, such as to a removal position 38. The downstop 30 is also operable to a reinforced position 40 that is generally defined by an outward deflection 42 of the downstop 30 of a first distance 44 from the blocking position 32. The release position 36 of the downstop 30 is defined by an inward deflection 46 of the downstop 30 of a second distance 48 also from the blocking position 32. Typically, the second distance 48 from a blocking position 32 is greater than the first distance 44 from the blocking position 32. The release position 36 of the downstop 30 is defined by a portion of the downstop 30 moving into the interior 28 of the frame 22. When the downstop 30 is in the release position 36, the downstop 30 is able to bypass the housing 24, such that the downstop 30 and the frame 22 can rotate beyond the fully-open position 34 and to the removal position 38. This removal position 38 allows for removal of the frame 22 from the housing 24. Such removal may be for repair of the frame 22 or replacement of the frame 22 for the glovebox assembly 12 or to allow for access to an interior portion of the glovebox assembly 12 and/or the dashboard 14 to enable servicing therein.

Referring again to FIGS. 1-8, the downstop 30 is typically connected to the frame 22 at a deflecting flange 60. The downstop 30 and the deflecting flange 60 each make up at least a portion of the interlock system 10. The deflecting flange 60 can be integrally formed with each of the frame 22 and the downstop 30. In this manner, as the downstop 30 moves between the release position 36, the blocking position 32 and the reinforced position 40, the downstop 30 rotates relative to the frame 22 through operation of the deflecting flange 60. The deflecting flange 60 can be a substantially rigid member that rotates about a hinge, such as a living hinge 62. The downstop 30 can be defined by a partial separation between the deflecting flange 60 and the surrounding portion of the frame 22. In this manner, the only direct connection between the deflecting flange 60 and the frame 22 is at the living hinge 62. According to various embodiments, the living hinge 62 can be disposed proximate a rear wall 64 of the frame 22, where the rear wall 64 defines at least a portion of the interior 28 of the compartment of the frame 22.

According to various embodiments as exemplified in FIGS. 1-8, the downstop 30 can include an interlock flange 70 that extends generally outward and typically perpendicular from a portion of the deflecting flange 60. Typically, the interlock flange 70 is also part of the interlock system 10. When the downstop 30 is in the blocking position 32 (exemplified in FIG. 6), the interlock flange 70 selectively engages a portion of the housing 24 when the frame 22 is in the fully-open position 34. Accordingly, a front surface 72 of the interlock flange 70 engages the housing 24 to define the fully-open position 34 of the frame 22 and selectively prevent significant over-rotation of the frame 22 relative to the housing 24. When the downstop 30 is moved to the release position 36 (exemplified in FIG. 8) and the frame 22 is moved beyond the fully-open position 34 to the removal position 38, the interlock flange 70 is moved consistent with the inward deflection 46, along with the deflecting flange 60, such that at least a portion of the interlock flange 70 moves into the interior 28 of the frame 22. When the frame 22 is moved from the removal position 38 or other over-rotated position 74 beyond the fully-open position 34 and back toward the fully-open position 34, a rear surface 76 of the interlock flange 70 includes an angled biasing surface 78 that engages a portion of the housing 24. When the angled biasing surface 78 engages the housing 24, the housing 24 serves to bias the downstop 30 and the interlock flange 70 toward the release position 36 such that the interlock flange 70 can move past a portion of the housing 24. When the interlock flange 70 passes the housing 24 such that the frame 22 is in the fully-open position 34, the interlock flange 70 and the downstop 30 are biased back outward through a return force 80 of the deflecting flange 60 to the blocking position 32.

Referring again to FIGS. 1-8, the downstop 30 and the interlock flange 70 can be moved from the blocking position 32 to the release position 36 by the user engaging a release surface 90 of the deflecting flange 60. The release surface 90 of the deflecting flange 60 can include textured features 92 that includes a plurality of ribs 94 or other physical features. These ribs 94 can be used to provide an indication or tactile feedback to the user that the user is touching the release surface 90. Accordingly, the user may not need to visually inspect whether they are engaging the release surface 90 to remove the frame 22 from the housing 24. Once the user feels an indication that they are engaging the release surface 90, the user can apply an inward force 96 to the release surface 90 of the deflecting flange 60 that moves the downstop 30 and interlock flange 70 to the release position 36 and at least partially within the interior 28 of the frame 22. Once in the release position 36, the downstop 30 and interlock flange 70 are placed in the position that allows for easy bypass of the interlock flange 70 past the housing 24 such that the frame 22 can be moved to the over-rotated positions 74 beyond the fully-open position 34 of the frame 22. According to various embodiments, return of the frame 22 from the over-rotated position 74 to the fully-open position 34 may be designed to require application of the inward force 96 to the ribs 94 of the release surface 90 to manually move the downstop 30 and interlock flange 70 to the release position 36 for returning the frame 22 to the fully-open position 34. Typically, the angled biasing surface 78 will allow for easy manipulation of the frame 22 from the over-rotated position 74 to the fully-open position 34 through engagement of the angled biasing surface 78 with the housing 24.

To assist in the operation of the engaging surface of the deflecting flange 60, the deflecting flange 60 can include a substantially rigid configuration that rotates about the living hinge 62 that is defined proximate the rear wall 64 of the frame 22.

Referring now to FIGS. 3-10, the frame 22 can include a reinforcing interlock 100 of the interlock system 10 that extends around a portion of the downstop 30. The reinforcing interlock 100 can include a substantially C-shaped configuration that allows for operation of the deflecting flange 60 between the release, blocking and reinforced positions 32, 40, within the reinforcing interlock 100. According to various aspects of the device, the reinforcing interlock 100 receives the downstop 30 in the reinforced position 40 and limits the outward deflection 42 of the downstop 30 to the first distance 44. Typically, the reinforced position 40 of the downstop 30 is defined by a downward force 102 that is applied to an outer lip 104 of the frame 22. This downward force 102 can sometimes be referred to as a customer abuse load where a customer may press downward or lean against the outer lip 104 of the frame 22 when the frame 22 was in the fully-open position 34. As discussed above, when the frame 22 is in the fully-open position 34, a front surface 72 of the interlock flange 70 engages a portion of the housing 24. When the downward force 102 is applied proximate an outer lip 104 of the frame 22, this downward force 102 deflects the frame 22 at least partially into the over-rotated position 74, and causes the housing 24 to place a rearward biasing force 106 against the front surface 72 of the interlock flange 70. When the interlock flange 70 deflects a distance approximately equal to the first distance 44, the rear surface 76 of the interlock flange 70 engages a receiving surface 108 of the reinforcing interlock 100. This engagement of the interlock flange 70 with the reinforcing interlock 100 serves to define the first distance 44 and also the reinforced position 40 of the downstop 30. This engagement also serves to reinforce the frame 22 such that the downward force 102 applied to the outer lip 104 of the frame 22 does not cause an over-rotation or potential damage to the frame 22 as a result of the application of the downward force 102.

Referring again to FIGS. 3-10, where the downstop 30 includes the interlock flange 70, the interlock flange 70 engages the housing 24 when the frame 22 is in the fully-open position 34. When the frame 22 is moved beyond the fully-open position 34 while the downstop 30 is in the blocking position 32, the frame 22 defines a reinforcing position 120 where the interlock flange 70 engages both the housing 24 and the reinforcing interlock 100. In this manner, the housing 24 is adapted to selectively engage the front surface 72 of the interlock flange 70 in both the fully-open position 34 and the reinforcing position 120. The rear surface 76 of the interlock flange 70 remains distal from the reinforcing interlock 100 when the frame 22 is in the fully-open position 34. However, when the frame 22 is moved to the reinforcing position 120 that is beyond the fully-open position 34, the interlock flange 70 engages both the reinforcing interlock 100 and the housing 24. Again, the engagement of the interlock flange 70 within the reinforcing interlock 100 reinforces the frame 22 in the reinforcing position 120 to prevent additional over-rotation of the frame 22.

Referring again to FIGS. 3-10, the downstop 30 is moved to the reinforced position 40 upon application of a first force or the rearward biasing force 106 upon the downstop 30 in a direction substantially normal to and toward the receiving surface 108 of the reinforcing interlock 100. This rearward biasing force 106 that is applied to the downstop 30 is generated typically through application of the downward force 102 applied on or proximate to the outer lip 104 of the frame 22 when the frame 22 is in the fully-open position 34. When the downward force 102 is applied, this first force, or the rearward biasing force 106, can include a first magnitude 130 that is typically sufficient to move the downstop 30 toward the reinforced position 40. Alternatively, when the downstop 30 is moved to the release position 36 through application of a second force, also referred to as the inward force 96, upon the release surface 90 of the deflecting flange 60 for the downstop 30, this second force or inward force 96 is typically exerted in a direction generally perpendicular to the first force and also toward an interior 28 of the frame 22. The first force that moves the downstop 30 toward the reinforced position 40 has a first magnitude 130 and the second force that moves the downstop 30 toward the release position 36 has a second magnitude 132. Typically, the first magnitude 130 is equal to the second magnitude 132. It is also contemplated that the first magnitude 130 can be greater than the second magnitude 132. In this manner, when the downward force 102 is applied to the outer lip 104 of the frame 22, deflection of the downstop 30 toward the reinforced position 40 serves to absorb a substantial amount of the downward force 102. Again, this downward force 102 is transferred to an application of the rearward biasing force 106 to move the downstop 30 toward the release position 36. Accordingly, application of the rearward biasing force 106 serves to absorb at least a portion of the downward force 102 to prevent overdeflection or damage to the frame 22 as the frame 22 moves into the reinforcing position 120. Conversely, application of the inward force 96 to move the downstop 30 to the release position 36 may require a substantially minimal inward force 96 such that removal of the frame 22 from the housing 24 can be done in a substantially convenient manner and performed by hand and without the use of tools. The deflecting flange 60 can be adapted such that outward deflection 42 of the deflecting flange 60 may require a greater amount of force than inward deflection 46 of the deflecting flange 60.

It should be understood that a certain higher magnitude of downward force 102 applied to the outer lip 104 of the frame 22 may be sufficient to cause damage to the frame 22 within the housing 24.

Referring again to FIGS. 3-10, when the downstop 30 is moved into the release position 36, the interlock flange 70 is at least partially disposed within an interior 28 of the frame 22. In this manner, the interlock flange 70 is adapted to bypass the housing 24 to define a removal position 38 of the frame 22. The removal position 38 of the frame 22 is beyond the fully-open position 34 and is within the over-rotated positions 74 of the frame 22. It is contemplated that the frame 22 is removable from the housing 24 when the frame 22 is moved into the removal position 38. The release position 36 of the interlock flange 70 also serves to place the interlock flange 70 within a boundary or clearance space 140 that is defined between an outer surface 142 of the reinforcing interlock 100 and an exterior surface 144 of the sidewall 146 of the frame 22. The clearance space 140 may also be defined between the sidewall 146 of the frame 22 and a portion of the housing 24 past which the interlock flange 70 passes to allow the frame 22 to move to the removal position 38. The reinforcing interlock 100 is adapted such that the outer surface 142 of the reinforcing interlock 100 is allowed to bypass the housing 24 without further manipulation when the downstop 30 is moved to the release position 36. Accordingly, when the downstop 30 is moved to the release position 36, the interlock flange 70 is moved into this clearance space 140 such that the downstop 30 and reinforcing interlock 100, as well as the interlock flange 70, can bypass the housing 24 to move the frame 22 into the over-rotated positions 74 and the removal position 38 as desired.

Referring again to FIGS. 1-10, a vehicle 20 can include a housing 24 that is disposed within a dashboard 14. The frame 22 is rotationally operable within the housing 24. An interlock flange 70 is operable within the frame 22 between the blocking position 32 that engages the housing 24 in the fully-open position 34, a release position 36 wherein the frame 22 is selectively removable from the housing 24, and a reinforced position 40 where the interlock flange 70 is contained between the frame 22 and the reinforcing interlock 100 for selectively limiting over-rotation of the frame 22. It is contemplated that the reinforced position 40 of the downstop 30 is further defined by an outward deflection 42 of the downstop 30 of the first distance 44 from the blocking position 32. The release position 36 of the downstop 30 is further defined by an inward deflection 46 of the downstop 30 of the second distance 48 from the blocking position 32. Typically, the second distance 48 from the blocking position 32 is greater than the first distance 44 from the blocking position 32. Additionally, in various embodiments, the inward deflection 46 of the downstop 30 may require a lesser amount of the inward force 96 to achieve the release position 36 while the outward deflection 42 of the downstop 30 may require a greater amount of the rearward biasing force 106 to achieve the reinforced position 40. This greater amount of the rearward biasing force 106 can be used to absorb at least a portion of a downward force 102 exerted upon the outer lip 104 of the frame 22 to prevent over-rotation and potential damage that may be caused to the frame 22 as it operates within the housing 24.

Referring again to FIGS. 1-12, the glovebox assembly 12 can include a container 26 defined by the frame 22 having an interior 28. The reinforcing interlock 100 is adapted to extend outward from a sidewall 146 of the container 26. The interlock flange 70 is generally and typically perpendicular to the sidewall 146 of the container 26, and, in a rest state 160, defines a blocking position 32. The interlock flange 70 is adapted to be selectively operable between an inward release position 36 of the interlock flange 70 and is at least partially within an interior 28 and an outward reinforced position 40 where the interlock flange 70 engages the reinforcing interlock 100. It is contemplated that the reinforcing interlock 100, the interlock flange 70, the downstop 30 and the deflecting flange 60 can be integrally formed as a single piece defined by the frame 22.

Referring now to FIGS. 6-10, it is contemplated that the downstop 30 can include a supplemental contacting area 170 that extends outward from an interlock flange 70. The contacting area 170 can be defined by a ridge 172 that extends outward from the deflecting flange 60 and supplements the engagement between the interlock flange 70 and the reinforced interlock. The contacting area 170, when the frame 22 is moved to the reinforced position 40 after application of the downward force 102, can engage the receiving surface 108 of the reinforcing interlock 100, along with the rear surface 76 of the interlock flange 70. In this manner, the contacting area 170 and the interlock flange 70 cooperate to transfer a portion of the downward force 102 into the reinforcing interlock 100.

The reinforcing interlock 100 defines a more robust structure of the frame 22 that can receive and support the frame 22 within the housing 24 to define the fully-open position 34 and also the reinforcing position 120 of the frame 22. In such an embodiment, it is contemplated that the magnitude of force required to move the deflecting flange 60 to the release position 36 may be equal to the magnitude of force for the outwardly deflecting flange 60 to the reinforcing position 120. The use of the reinforcing interlock 100 serves to limit the amount of outward deflection 42 that may be experienced by the deflecting flange 60 to the first distance 44. Through this configuration, a deflecting flange 60 that has a substantial amount of flexibility for allowing movement of the deflecting flange 60 to the release position 36 can be used. The ease of flexibility of the deflecting flange 60 is supplemented at the outside of the frame 22 through use of the reinforcing interlock 100. The reinforcing interlock 100 provides an additional structure that limits outward deflection 42 of the deflecting and interlock flanges 60, 70 and serves to absorb at least a portion of the downward force 102 applied to the outer lip 104 of the frame 22. In this manner, a single deflecting structure in the form of the interlock system 10 can be used for both defining the downstop 30 and also defining the release mechanism for removing the frame 22 from the housing 24. Additionally, this configuration of the downstop 30 and reinforcing interlock 100 of the interlock system 10 allows for easy and convenient manipulation of the downstop 30 to the release position 36 while simultaneously providing a robust support for absorbing a downward force 102 that may be applied to the outer lip 104 of the frame 22.

According to various embodiments, it is contemplated that the frame 22 and housing 24 can be made of various materials that can include, but are not limited to, plastic, various polymers, composite materials, combinations thereof, and other similar materials.

The interlock system 10 disclosed herein can be used within various storage compartments of a vehicle 20. Such storage compartments can include, but are not limited to, glovebox assemblies 12, console compartments, ashtrays, cupholders, rear storage compartments and other various storage compartments within the vehicle 20.

According to various embodiments, the frame 22, downstop 30, deflecting flange 60, interlock flange 70 and reinforcing interlock 100 can be integrally formed from a single piece. It is also contemplated that the deflecting flange 60 and reinforcing interlock 100 can be separate pieces that are attached to the frame 22 for operating the downstop 30.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle glovebox comprising:
   a frame rotationally operable within a housing; and
   a downstop defined within the frame at a deflecting flange that is integrally formed with each of the frame and the downstop, wherein;
      the downstop in a blocking position engages the housing to define a fully-open position of the frame; and
      the downstop is operable to a release position that defines rotation of the frame beyond the fully-open position.

2. The vehicle glovebox of claim 1, wherein a reinforced position of the downstop is defined by an outward deflection of the downstop of a first distance from the blocking position, and wherein the release position of the downstop is defined by an inward deflection of the downstop of a second distance from the blocking position.

3. The vehicle glovebox of claim 2, wherein the second distance from the blocking position is greater than the first distance from the blocking position.

4. The vehicle glovebox of claim 2, wherein the frame includes a reinforcing interlock that extends around the downstop, wherein the reinforcing interlock receives the downstop in the reinforced position and limits the outward deflection of the downstop to the first distance.

5. The vehicle glovebox of claim 4, wherein the downstop includes an interlock flange that engages the housing in the blocking position when the frame is in the fully-open position, and wherein the interlock flange engages both of the housing and the reinforcing interlock when the frame is in the reinforcing position.

6. The vehicle glovebox of claim 5, wherein the housing selectively engages a front surface of the interlock flange in the fully-open position and the reinforcing position, and wherein the reinforcing interlock engages a rear surface of the interlock flange when the frame is in the reinforcing position.

7. The vehicle glovebox of claim 5, wherein when the downstop is in the release position, the interlock flange is at least partially disposed within the interior of the frame and is adapted to bypass the housing to define a removal position of the frame, wherein the frame is removable from the housing in the removal position.

8. The vehicle glovebox of claim 5, wherein the release position of the interlock flange places the interlock flange within a boundary defined between a portion of the housing proximate an outer surface of the reinforcing interlock and an exterior surface of a sidewall of the frame.

9. The vehicle glovebox of claim 4, wherein the downstop is moved to the reinforcing position upon application of a first force upon the downstop and in a direction substantially normal to and toward a receiving surface of the reinforcing interlock, the first force having a first magnitude, and wherein the downstop is moved to the release position upon application of a second force upon the downstop and in a direction generally perpendicular to the first force and toward an interior of the frame, wherein the second force has a second magnitude, wherein the first magnitude is greater than the second magnitude.

10. The vehicle glovebox of claim 2, wherein the reinforced position of the frame is defined by a downward force applied to the frame when the frame is in the fully-open position.

11. The vehicle glovebox of claim 1, wherein the deflecting flange is a substantially rigid member that rotates about a living hinge.

12. The vehicle glovebox of claim 11, wherein the living hinge is disposed proximate a rear wall of the frame.

13. A vehicle comprising:
   a housing disposed within a dashboard;
   a frame rotationally operable within the housing; and
   an interlock flange operable within the frame between a blocking position that engages the housing in a fully-open position, a release position wherein the frame is selectively removable from the housing, and a reinforced position wherein the interlock flange is contained between the frame and a reinforcing interlock for limiting over rotation of the frame.

14. The vehicle of claim 13, wherein the reinforced position of the interlock flange is defined by an outward deflection of the interlock flange of a first distance from the blocking position, and wherein the release position of the interlock flange is defined by an inward deflection of the interlock flange of a second distance from the blocking position, and wherein the second distance from the blocking position is greater than the first distance from the blocking position.

15. A glovebox comprising:
   a container having an interior;
   a reinforcing interlock extending outward from a sidewall of the container; and
   an interlock flange that is generally perpendicular to the sidewall in a blocking position, wherein the interlock flange is selectively operable between an inward release position wherein the interlock flange is at least partially within the interior, and an outward reinforcing position wherein the interlock flange engages the reinforcing interlock.

16. The glovebox of claim 15, wherein the container, the reinforcing interlock and the interlock flange are integrally formed as a single piece.

17. The glovebox of claim 15, wherein the interlock flange is rotationally operable relative to the container about a living hinge defined within a rear wall of the container.

18. The glovebox of claim 15, wherein the inward release position of the interlock flange places the interlock flange within a clearance space defined between a portion of a housing proximate an outer surface of the reinforcing interlock and an exterior surface of the sidewall.

\* \* \* \* \*